United States Patent [19]

Gardner et al.

[11] Patent Number: 4,775,941
[45] Date of Patent: Oct. 4, 1988

[54] APPARATUS AND METHOD FOR CONTROLLING THE SHEAR MECHANISM OF A GLASSWARE FORMING MACHINE

[75] Inventors: E. Boyd Gardner, Bloomfield; Steven J. Pinkerton, Ridgefield, both of Conn.

[73] Assignee: Emhart Industries, Inc., Farmington, Conn.

[21] Appl. No.: 57,453

[22] Filed: Jun. 3, 1987

[51] Int. Cl.⁴ .............................................. G06F 15/46
[52] U.S. Cl. ................................... 364/473; 364/142; 65/174
[58] Field of Search ............... 364/142, 143, 174, 475, 364/476, 473; 83/58, 72; 65/174

[56] References Cited

U.S. PATENT DOCUMENTS

| | | | |
|---|---|---|---|
| 4,174,647 | 11/1979 | Dahms | 83/58 |
| 4,242,621 | 12/1980 | Spaulding | 364/142 X |
| 4,365,289 | 12/1982 | Small et al. | 364/143 |
| 4,401,930 | 8/1983 | Kato et al. | 364/142 X |

Primary Examiner—Jerry Smith
Assistant Examiner—Allen MacDonald
Attorney, Agent, or Firm—Arthur B. Moore

[57] ABSTRACT

A control system for controlling the operation of the shears of a glassware forming machine. The control system incorporates sensors which produce signals representative of predetermined shear positions in each shear cycle, and in particular, makes use of the correlation between the duration of a Zero Crossover Signal and the point of maximum overlap of the shears. The system adjusts the time of deactuation of a fluidic drive assembly, and therefore, the overlap displacement, if the termination of the Zero Crossover pulse falls outside a defined "deadband". The Zero Crossover signal may also be monitored to provide alarm signals or shut the system down.

14 Claims, 7 Drawing Sheets

APPARATUS AND METHOD FOR CONTROLLING THE SHEAR MECHANISM OF A GLASSWARE FORMING MACHINE

BACKGROUND OF THE INVENTION

The invention relates generally to control systems for controlling the cyclical motion of fluidically driven members. More specifically, the invention relates to a control system for controlling straight-line shear for cutting gobs from a stream of molten glass in a glassware forming machine.

The use of shears for cutting gobs from a stream of molten glass falling from a feeder of a glassware forming machine is well-known in the prior art. Such shears are generally of either the arcuate or straight-line type, each type having a cyclically oscillating single pair of opposed blades associated with a single stream of molten glass. An example of a prior art double gob shear assembly of the straight-line type is shown in U.S. Pat. No. 4,174,647, dated Nov. 20, 1979, and assigned to the assignee of the present invention. Prior art shears are generally activated by pneumatic (or fluidic) means interconnected in a complex arrangement of various valves and cylinders.

The present invention relates to an improvement over the prior art control system of commonly assigned U.S. Pat. No. 4,467,431, the disclosure of which is incorporated by reference herein. Such patent discloses a control system for pneumatically driven straight-line shears (such as shears of the type disclosed in the U.S. Pat. No. 4,174,647 patent cited above), such control system incorporating a series of sensors which produce signals representing predetermined shear positions in each shear cycle. As illustrated in FIGS. 5 and 6 at the U.S. Pat. No. 4,467,431 and the text discussing these Figures, such prior art system incorporates four sensors—a return delay sensor, a zero crossover sensor, an overlap sensor, and a cushion sensor, each of which produces an output signal at a predetermined point of the travel of the shears, for controlling various aspects of the shears' operation in accordance with the method disclosed therein. The shears are pneumatically driven in the forward (cutting) and reverse direction by selectively energizing and deenergizing (or reversing) the cylinder assembly of FIG. 3. The timing of this energization and deenergization, and hence the motion profile of the shears, is determined by the timing of the return sensor and overlap sensor signals, as well as by a return delay time which is added to the return sensor signal to determine the off time of the shears' pneumatic drive.

As illustrated in FIGS. 6 and 7 of the U.S. Pat. No. 4,467,431 and discussed at column 6, lines 17 and following, the return delay time is calculated by a circuit which incorporates an up/down counter, the count from which decrements or increments as a function of the overlap signal from the previous cycle. When an overlap sensor signal occurs (signifying that the shears have travelled at least as far as such sensor), a "count down" command is produced causing the return delay time to be decremented; the converse happens if such sensor is not triggered in the previous cycle. Although this system provided excellent performance as compared with prior art shears control systems, the continual incrementing and decrementing of the return delay time has imposed a limitation on the accuracy with which shears travel could be controlled.

As an improvement to the assignee's commercial system based upon the invention of the U.S. Pat. No. 4,467,431, an additional, "excess overlap" sensor was included in the sensor housing in order to detect the travel of the shears blades beyond the desired point of maximum overlap to a predetermined point at which an alarm is triggered warning the operator that a reset of the drive electronics or other corrective action is required. Other improvements, not directly relevant to the present invention, are the inclusion of a further sensor which detects the return of the shears to a given, small interval from the base-line or equilibrium position, and the incorporation of a "cushion delay" circuit which acts in cooperation with such further ("park") sensor to enable the operator to adjust the cushioning of the shears return stroke. This drastically reduced the possibility of excessive impact in the system illustrated in the U.S. Pat. No. 4,467,431.

Accordingly, it is a principal object of the invention to provide an improved system for controlling the operation of pneumatically driven straight-line shears. In particular, it is desired to improve the accuracy with which the maximum travel of the shears can be controlled.

Another object is to reduce the normal variation of shears travel, thereby providing more reliable gob drop characteristics and other performance advantages.

SUMMARY OF THE INVENTION

In furthering the above and additional objects, the invention provides a control system for controlling the cyclical operation of fluidically driven shears for severing gobs from a stream of molten glass, including means for energizing the shears fluidic drive to cause the shears to move towards each other; means for reversing the energizing means; zero crossover sensor means for producing first and second signals at the respective times in each cycle when the shears pass their zero crossover positions; means for defining a deadband period relative to the time of said first signal; and means for adjusting the time of reversing the energizing means if said second signal occurs outside of the deadband period. The adjusting means delays the time of reversing the energizing means if said second signal occurs before the deadband period, and advances the time of reversing the energizing means if said second signal occurs after the deadband period. No adjustment is made if said second signal occurs during said deadband period.

Advantageously, means are provided for altering the deadband period. This adjustment can be both in the beginning of said deadband period, and the duration of such period.

Such control system may further include means for defining an "excessive bandwidth" period which is wider than the deadband period, and an alarm means for signalling to the operator if the second signal occurs outside of such excessive bandwidth period. The control system may further include means for defining a maximum time allowed between said first and second signals, and for disabling the energizing means if the second signal occurs after this time is exceeded.

The preferred embodiment of the invention comprises an improved apparatus and method for controlling the shears of a glassware forming machine sharing many of the same features as disclosed in commonly assigned U.S. Pat. No. 4,467,431. Such improved control system includes means for energizing the shears to cause them to move towards each other, a return sensor for producing a return signal output when the shears are at a first predetermined position in each cycle, a return delay timer responsive to such return signal output for producing a delayed output for reversing the energizing means, and a zero crossover sensor for producing first and second signals at the respective times in each cycle in which said shears pass their zero crossover positions. In addition to the above elements, all found in the system of U.S. Pat. No. 4,467,431, the control system includes means for defining a deadband period relative to the time of said first signal, and means for detecting whether or not said second signal occurs within said deadband period and for adjusting the time of said delayed output in the event said second signal occurs outside of said deadband period.

BRIEF DESCRIPTION OF THE DRAWINGS

The above and additional aspects of the invention are illustrated in the following detailed description of the preferred embodiment, which should be taken together with the drawings in which.

DETAILED DESCRIPTION

Figure 2:
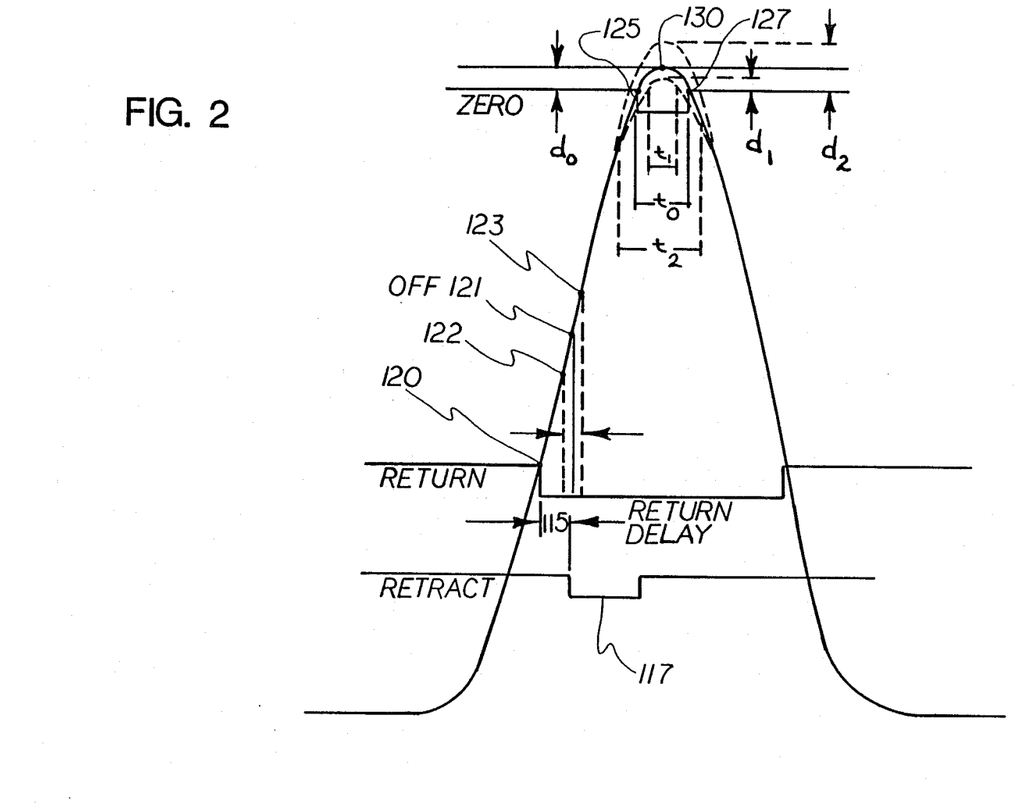
FIG. 2 is a graph of shear blade motion vs. time.
Figure 7:
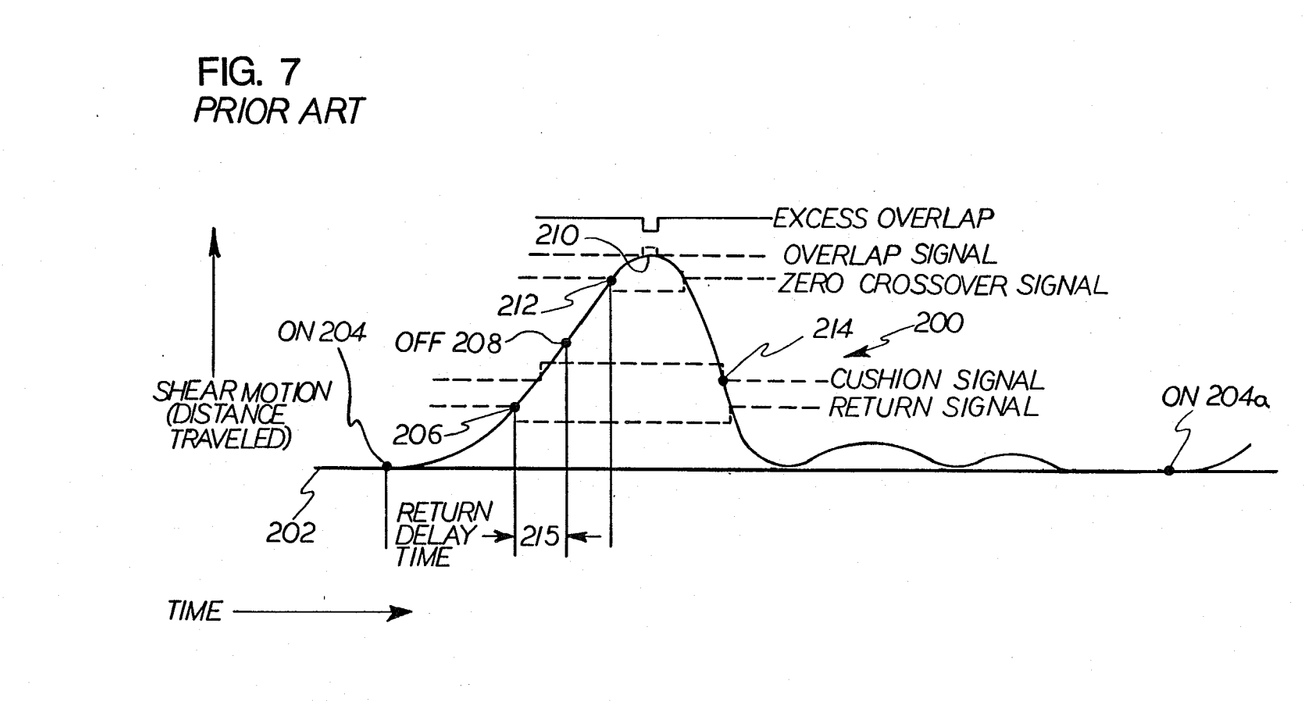
FIG. 7 is a prior art graph of shear blade motion vs. time, for the shears control system of U.S. Pat. No. 4,467,431 as improved subsequently to the filing of such patent.

Reference should now be had to FIGS. 2 and 7, which respectively represent the shears motion control characteristics of the present invention, and the characteristics of a prior art system. These figures plot the distance travelled by the shears in the vertical axis, against time on the horizontal axis. The prior art plot of FIG. 7 is quite similar to FIG. 6 of U.S. Pat. No. 4,467,431, but includes an additional Excess Overlap sensor signal which is issued in response to the shears travelling a certain distance beyond the desired overlap displacement. The significance of the various other signals shown in FIG. 7 and their functioning in regulating shears overlap displacement is disclosed in the U.S. Pat. No. 4,467,431.

FIG. 2 gives a shears motion profile characteristic in accordance with the present invention. Not directly relevant to the present invention is the more rapid "cushioning" of the shears return motion. The phenomenon underlying the present invention is the empirically proven correlation between the pulse width of the Zero Crossover Signal ($t_0$, $t_1$, or $t_2$) and the overlap displacement ($d_0$, $d_1$, or $d_2$, respectively). Applicants have observed that these characteristics remain correlated within a small error over a large number of shears cycles; cf. discussion of FIG. 5, below.

Reference is made in the specification and claims hereof to "first" and "second" signals indicating the respective times in each cycle in which the shears have passed their Zero Crossover position. In the preferred embodiment, such signals comprise the leading and trailing edges of the Zero Crossover pulse, respectively. However, it is certainly possible to employ other types of signals for this purpose.

Figure 1:
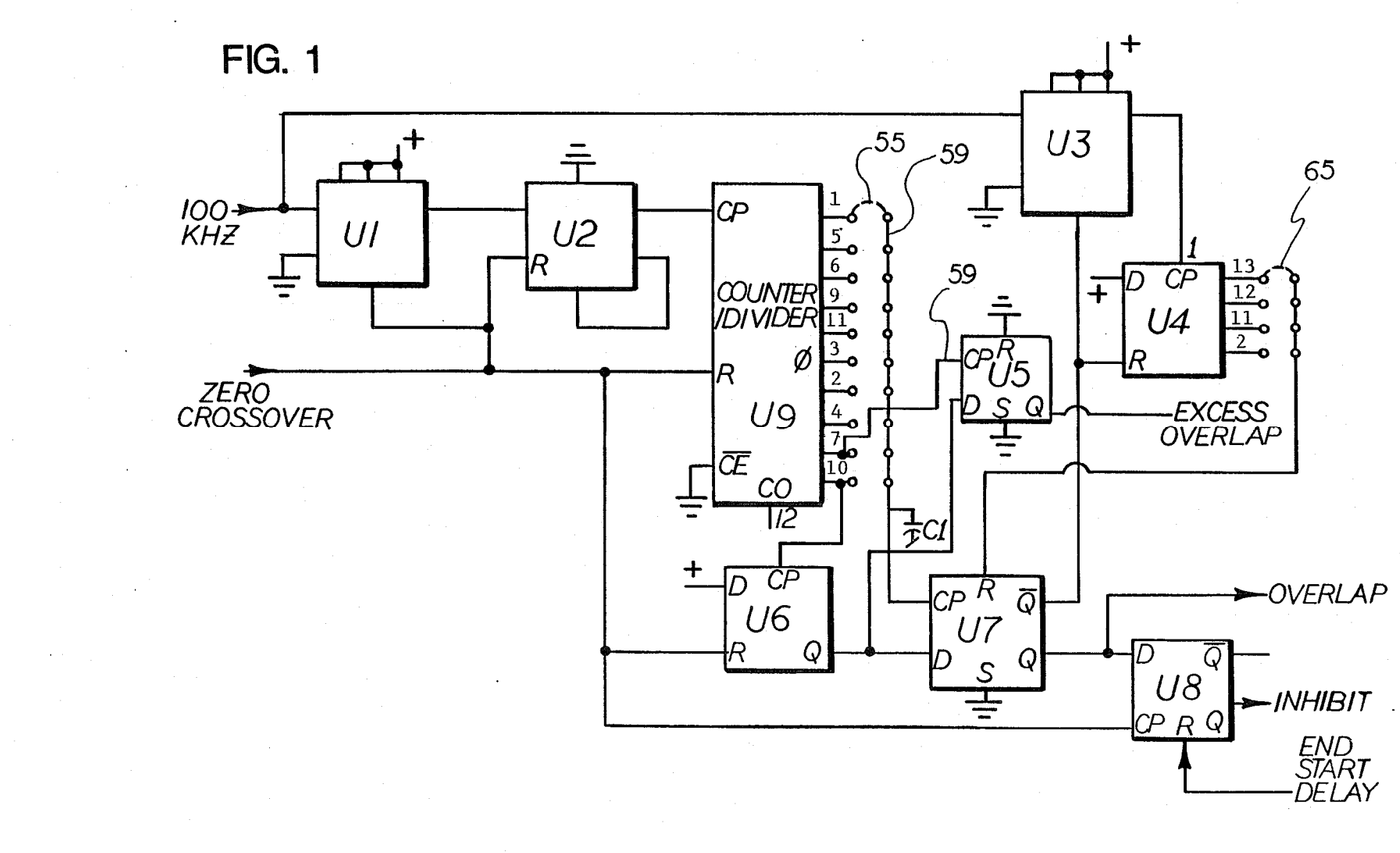
FIG. 1 is a circuit schematic diagram of a "deadband" control circuit in accordance with the invention.

Referring now to FIG. 1, there is shown a schematic of a deadband control circuit embodying the principles of the invention. As illustrated in FIG. 2, the Zero Crossover signal is a pulse which goes low during the period of overlap of the shears. During this period, the counting/dividing system comprising elements U1, U2, U9, and U6 is released for counting. U1 and U2, respectively, divide the 100 KHz input signal by 100 (1 KHz out) and 2 (500 Hz out). (Similarly, frequency divider U3 provides a 1 KHz output signal.) U9 is a five stage Johnson counter having ten decoded outputs (pins 3, 2, 4, 7, 10, 1, 5, 6, 9, and 11, respectively). In an operative embodiment of the invention, element U9 comprised a CD4017B type counter/divider of Radio Corporation of America. The positive clock transitions at input CP advances the U9 counters one count every 2 milliseconds. At the end of five steps (10 milliseconds), output 10 goes high providing data for flip flops U5 and U7. On the next selected high to low transition (determined by the operator's setting of a jumper 55 from bus 58) at the CP input to FF U7, shift register U4 is loaded. Illustratively, U4 consisted of a CD4015B type 4-stage shift register of Radio Corporation of America. The loading of U4, which has four parallel-output registers, permits these registers to advance one stage each millisecond. On the pulse selected by the setting of jumper 65, FF U7 is reset; thus FF U7 is set for 1, 2, 3, or 4 milliseconds.

Reference should now be had to U.S. Pat. No. 4,467,431, and in particular to FIG. 7 and the specification starting at column 6, line 17. In the system of the present invention, the "Return Delay Timer" circuit 14 of U.S. Pat. No. 4,467,431 FIG. 7 is modified by eliminating the Overlap Sensor-Optical coupler 252 input to FF 254, and replacing this with the Overlap signal from the circuit of FIG. 1 of the present application. Additionally, the "count inhibit" input of up/down counter 225, which is connected to the common negative level in the prior art circuit of the U.S. Pat. No. 4,467,431, is disconnected therefrom and connected to the Inhibit output of FF U8. The Overlap output of FF U7 provides a 1, 2, 3, or 4 msec pulse during which the adjustment direction of the "return delay" circuit is set for "down". If the Zero Crossover pulse ends (reverts to high) during the time FF U7 is set, FF U8 will be set and its Inhibit output will go high which inhibits the "return delay" counter from any change. Advantageously, in the event a correction of the return delay period is enabled, the circuit (U.S. Pat. No. 4,467,431 FIG. 7) counts up or down by a time change of 0.04 msec per cycle. This is a finer resolution than the 0.1 msec per cycle of the prior art. (cf. column 7, lines 27-30 of U.S. Pat. No. 4,467,431). FF U8 is reset at the end of the "start delay" period, "ON" point 204 in FIG. 7, for the next cycle.

Although the deadband circuit of FIG. 1 is designed to operate in conjunction with the "Return Delay Timer" circuit of FIG. 7 from U.S. Pat. No. 4,467,431, it should be noted that the "deadband" principle of the present invention has broader applicability. That is, it may be used with other schemes for determining the deactuation time of a shears drive assembly, and not just the Return Sensor-Return Delay arrangement of U.S. Pat. No. 4,467,431.

In the configuration of FIG. 1, FF U5 is connected via line 59 to counter/divider U9 to be set on a count of 13 (26 milliseconds) and reset on the next count of 2 (4 msec.). The output of FF U5 provides an "Excess Overlap" signal at a predetermined duration of the Zero Overlap signal. Thus, if the Zero Crossover pulse width exceeds the predetermined value, i.e. its trailing edge occurs outside of a bandwidth period defined by this value, an "excess overlap" signal is generated. Naturally, this bandwidth period is wider than the deadband period. The circuit may incorporate a plurality of circuits of this type, e.g. to indicate whether the second signal occurs at an unduly early point (before the deadband period), or to have more than one "excess overlap" level—perhaps one level which issues an alarm and another, higher, level which shuts the shears down. Each of these would utilize appropriate jumper settings, as discussed below with reference to FIG. 5.

Figure 3:
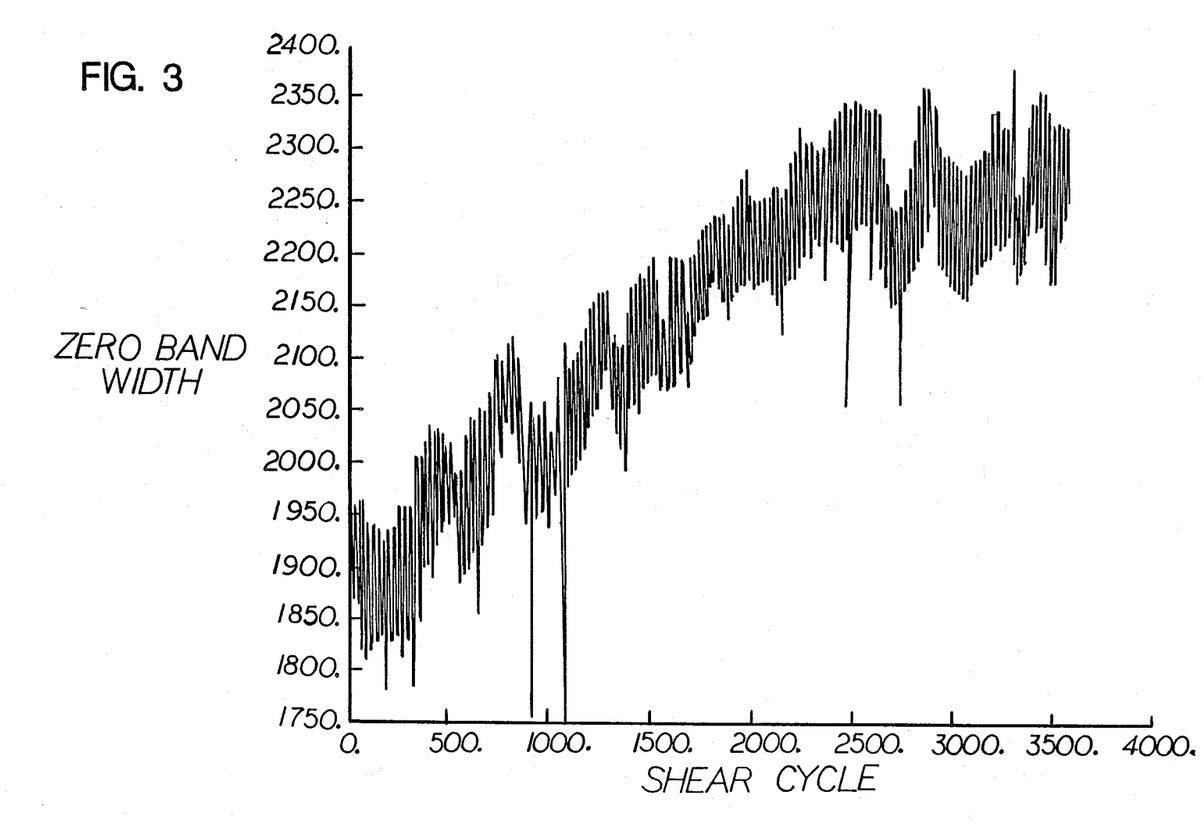
FIG. 3 is a plot of the width of the zero crossover pulse over a number of cycles with no servocontrol of overlap.

The technique of the invention makes use of the observed tendency of pneumatically driven straight line shears of the type shown in commonly assigned U.S. Pat. No. 4,174,647, to exhibit a well defined range of Zero Crossover values. FIG. 3 shows that over a large number of shears cycles, during which the Zero Crossover pulse width drifted upwards due to friction, wear, and other factors, this signal followed a natural bandwidth on the order of 1 millisecond. During these measurements, the shears were not subject to servocontrol of overlap displacement. This natural bandwidth provides a good basis for setting the "deadband" period in the circuit of FIG. 1, by indicating how "tight" a control over Zero Crossover is compatible with the natural properties of the system.

Figure 4:
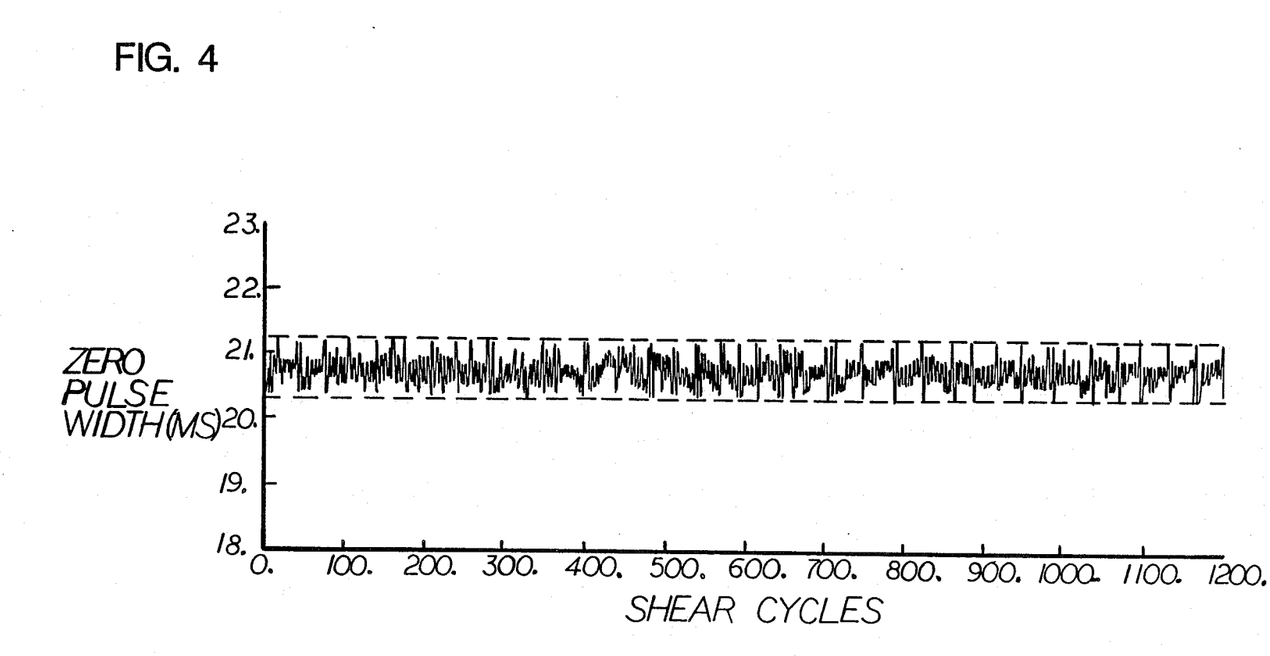
FIG. 4 is the pulse width of the zero crossover pulse over a number of cycles, with servocontrol.

FIG. 4 illustrates Zero Crossover pulse width measurements taken over a number of shears cycles using the circuit of FIG. 1 for servocontrol of Zero pulse width, with the jumper 65 set for a 1 msec. deadband interval, and a 0.04 msec. time change. The Zero Crossover pulse width varied as shown between upper and lower boundaries of 21.2 msec. and 20.3 msec.—a bandwidth of 0.9 msec. With reference to FIG. 2, this corresponds to a variation of the Return Delay within interval 119, and a variation of the Off point (start of actuation pulse 117 for the Retract solenoid) between extremes 122 and 123.

Figure 5:
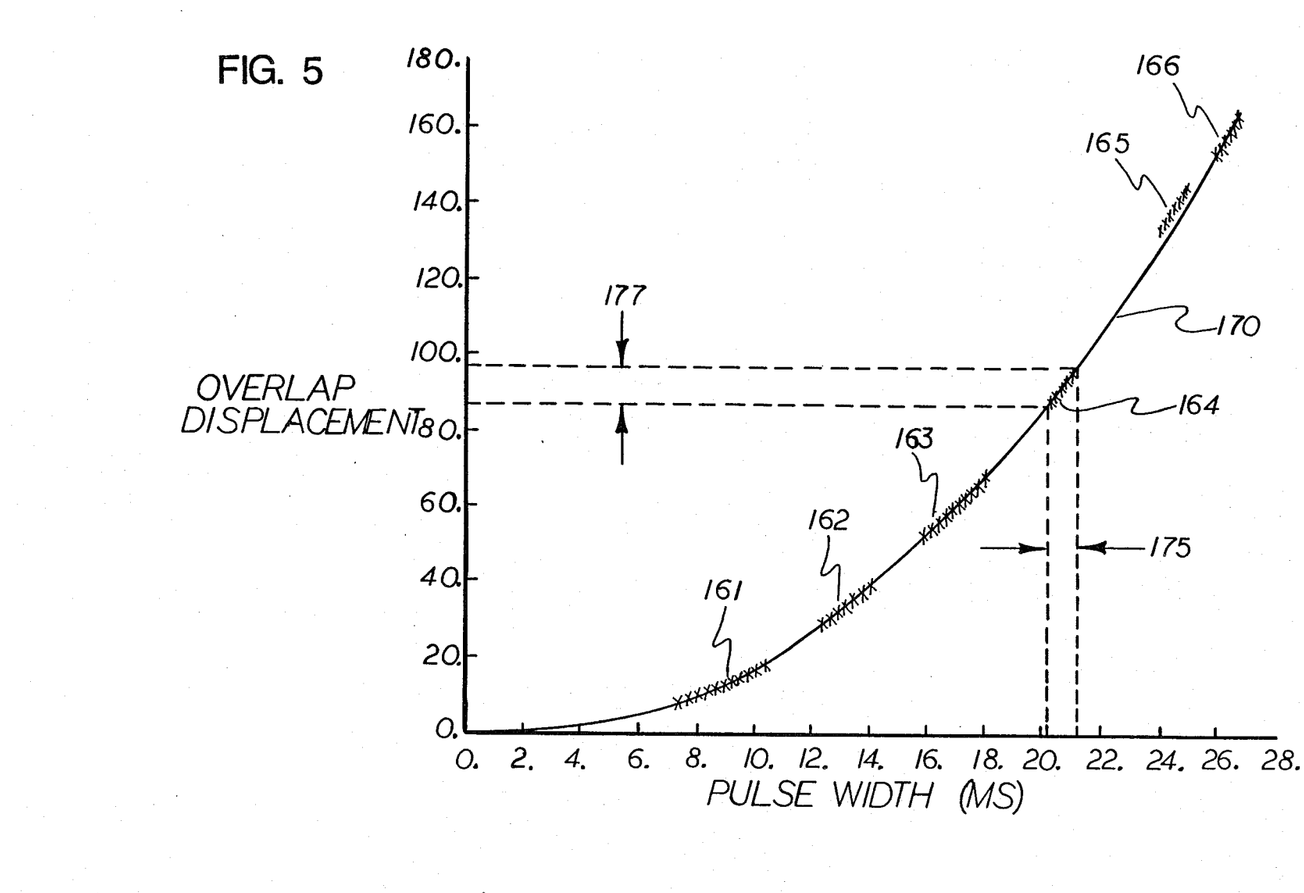
FIG. 5 is an interpolated plot of shears overlap displacement as related to the pulse width of the zero crossover pulse.

FIG. 5 plots pulse width against overlap displacement, and shows a curve fit to various groups 161–166 of readings taken over a large number of cycles with the "deadband" circuit of FIG. 1, each group corresponding to a different setting of the jumper 55. The regular pattern of these readings permits the fitting of a curve 170 which provides a well defined correlation between Zero pulse width and overlap displacement. Thus, it is possible to design the pulse width characteristics of a deadband control circuit such as that of FIG. 1 in accordance with known overlap displacement characteristics. This can be used to set "excess overlap" Zero Crossover pulse widths at which an alarm can be provided, or more extreme values at which the system should be shut down (the Excess Overlap signal from FF U5 of FIG. 1 is designed to shut the system down), taking into account prior knowledge of suitable overlap displacements for these actions. On receiving an "excess overlap" alarm, the operator can reset the "deadband" circuit to test whether the problem arises from the drive electronics vs. a valve malfunction or the like.

Figure 6:
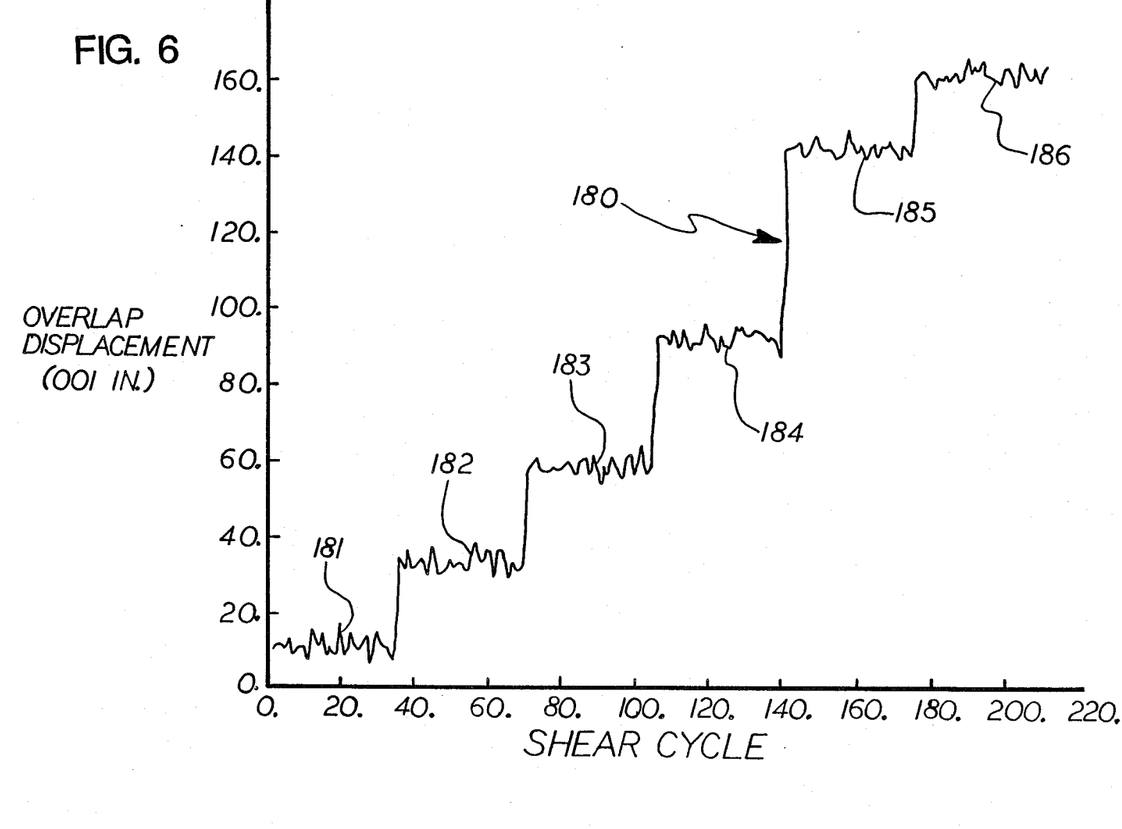
FIG. 6 is a plot of displacement over a number of shear cycles, with various settings of the "deadband" circuit of FIG. 1.

FIG. 6 shows overlap displacement variation over a number of shears cycles, at successive settings of the jumper 55 (FIG. 1). This clearly illustrates the flexibility of the operator's control over overlap displacement using the circuit of FIG. 1.

Applicants have observed that tracking Zero Crossover pulse widths during ongoing operation of the shears provides an excellent basis for diagnosing system performance. One may correlate the "signatures" of the Zero Crossover values with various types of fluidic drive malfunctions (faulty valves, piston seal leakage, etc.) and other problems, and use this to alert the operator to problems in advance of any serious impairment.

While reference has been made to specific embodiments, it will be apparent to those skilled in the art that various modifications and alterations may be made thereto without departing from the spirit of the present invention. Therefore, it is intended that the scope of this invention be ascertained by reference to the following claims.

We claim:

1. A control system for controlling the cyclical operation of fluidically driven shears for severing gobs from a stream of molten glass, comprising:
   means for energizing said fluidic drive to cause said shears to move towards each other;
   means for reversing said energizing means;
   zero crossover sensor means for producing first and second signals at the respective times in each cycle when said shears pass their zero crossover positions;
   means for defining a deadband period relative to said first signal; and
   means for adjusting the time of reversing said energizing means if said second signal occurs outside of said deadband period.

2. A control system as defined in claim 1 wherein said adjusting means delays the operation of said reversing means if said second signal occurs before said deadband period, and advances the time of operation of said reversing means if said second signal occurs after said deadband period.

3. An improved control system as defined in claim 1, further comprising operator-adjustable means for altering said deadband period.

4. An improved control system as defined in claim 3 wherein said altering means shifts the beginning of the deadband period relative to the first signal.

5. An improved control system as defined in claim 3 wherein said altering means changes the duration of the deadband period.

6. An improved control system as defined in claim 1, further comprising means for defining an excessive bandwidth period which is wider than said deadband period, and alarm means for signalling to the operator if the second signal occurs outside of the excessive bandwidth period.

7. An improved control system as defined in claim 1 further comprising means for defining a maximum permitted time between said first and second signals, wherein if said second signal occurs after said first signal by more than this maximum permitted time, the energizing means is disabled.

8. An improved control system for controlling the cyclical operation of shears in glassware manufacturing apparatus, of the type including means for energizing said shears to cause them to move towards each other, a return sensor for producing a return signal output when said shears are at a first predetermined position in each cycle, a return delay timer responsive to said return signal output for producing a delayed output for reversing said energizing means, and a zero crossover sensor for producing first and second signals at the respective times in each cycle in which said shears pass their zero crossover positions,     wherein the improvement comprises means for defining a deadband period relative to said first signal, and     means for detecting whether or not said second signal occurs within said deadband period, and for adjusting the time of said delayed output in the event said second signal occurs outside of said deadband period.

9. An improved control system as defined in claim 8, further comprising operator-adjustable means for altering said deadband period.

10. An improved control system as defined in claim 9 wherein said altering means shifts the beginning of the deadband period relative to the first signal.

11. An improved control system as defined in claim 9 wherein said altering means changes the duration of the deadband period.

12. An improved control system as defined in claim 8, further comprising means for defining an excessive bandwidth period which is wider than said deadband period, and alarm means for signalling to the operator if the second signal occurs outside of said excessive bandwidth period.

13. An improved control system as defined in claim 8, further comprising means for defining a maximum permitted period after said first signal for the occurrence of said second signal, and for disabling said energizing means if the second signal does not occur within the maximum permitted period.

14. A control system as defined in claim 8 wherein said adjusting means delays the operation of said reversing means if said second crossover signal occurs before said deadband period, and advances the time of operation of said reversing means if said second signal occurs after said deadband period.

* * * * *